Dec. 26, 1933. A. S. FITZ GERALD Re. 19,034

FAULT RESPONSIVE APPARATUS

Original Filed July 9, 1926 4 Sheets-Sheet 1

Fig. 2.

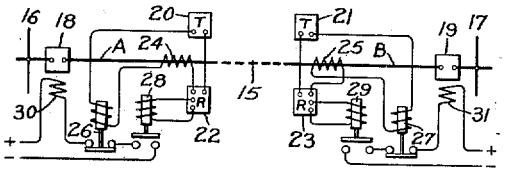

Fig. 3.

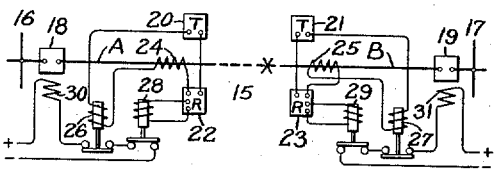

THROUGH FAULT

INTERNAL FAULT

| | | | | |
|---|---|---|---|---|
| Fig. 2a | 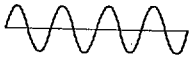 | LINE CURRENT AT A | 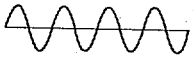 | Fig. 3a |
| Fig. 2b | 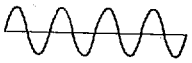 | LINE CURRENT AT B | 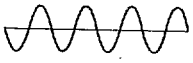 | Fig. 3b |
| Fig. 2c | 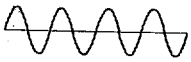 | TRANSMITTER PLATE VOLTAGE AT A<br>RECEIVER GRID VOLTAGE AT A | 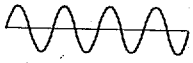 | Fig. 3c |
| Fig. 2d | 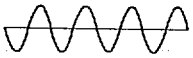 | TRANSMITTER PLATE VOLTAGE AT B<br>RECEIVER GRID VOLTAGE AT B | 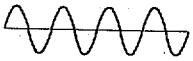 | Fig. 3d |
| Fig. 2e | 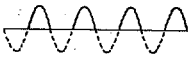 | RECEIVER PLATE VOLTAGE AT A | 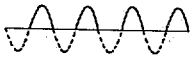 | Fig. 3e |
| Fig. 2f | 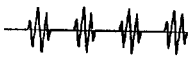 | WAVE TRANSMITTED FROM B<br>IMPRESSED GRID VOLTAGE<br>RECEIVER AT A | 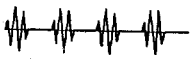 | Fig. 3f |
| Fig. 2g | 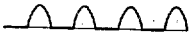 | PLATE CURRENT<br>RECEIVER AT A | | Fig. 3g |
| Fig. 2h | 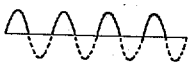 | RECEIVER PLATE VOLTAGE AT B | 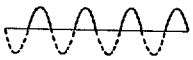 | Fig. 3h |
| Fig. 2i | 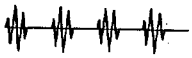 | WAVE TRANSMITTED FROM A<br>IMPRESSED GRID VOLTAGE<br>RECEIVER AT B | 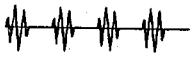 | Fig. 3i |
| Fig. 2j | 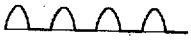 | PLATE CURRENT<br>RECEIVER AT B | | Fig. 3j |

Fig. 1.

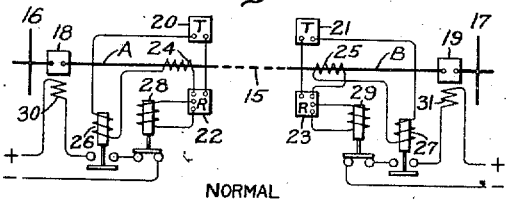

NORMAL

Inventor:
Alan S. Fitz Gerald,
by [signature]
His Attorney.

FAULT RESPONSIVE APPARATUS
Original Filed July 9, 1926 4 Sheets-Sheet 2
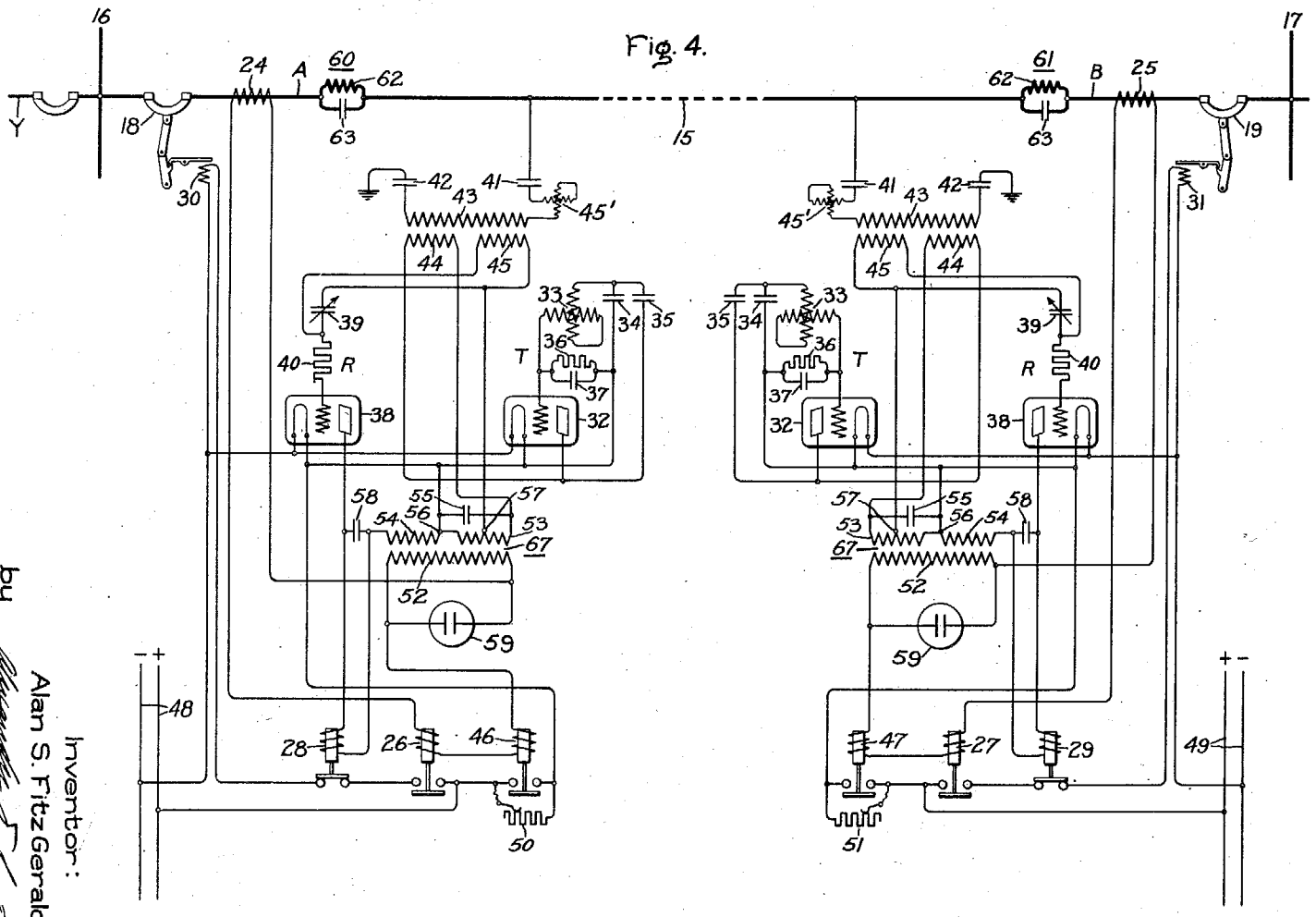
Inventor:
Alan S. Fitz Gerald,
by Alexander S. Lane
His Attorney.

Dec. 26, 1933. A. S. FITZ GERALD Re. 19,034

FAULT RESPONSIVE APPARATUS

Original Filed July 9, 1926 4 Sheets-Sheet 3

THROUGH FAULT

INTERNAL FAULT

Inventor:
Alan S. FitzGerald,
by Alexander S. Lane
His Attorney.

Dec. 26, 1933. A. S. FITZ GERALD Re. 19,034

FAULT RESPONSIVE APPARATUS

Original Filed July 9, 1926 4 Sheets-Sheet 4

Inventor:
Alan S. FitzGerald,
by
His Attorney.

Reissued Dec. 26, 1933 Re. 19,034

UNITED STATES PATENT OFFICE 19,034

FAULT RESPONSIVE APPARATUS

Alan S. Fitz Gerald, Wynnewood, Pa., assignor to General Electric Company, a corporation of New York Original No. 1,797,976, dated March 24, 1931, Serial No. 121,488, July 9, 1926. Application for reissue March 17, 1933. Serial No. 661,424

37 Claims. (Cl. 175—294)

My invention relates to improvements in fault responsive apparatus for electric circuits and more particularly to improvements in fault responsive protective apparatus and arrangements thereof wherein discriminating action is obtained by comparison of electric characteristics of a circuit at different points thereof so that on the occurrence of abnormal circuit conditions faulty sections of a circuit may be eliminated without impairing continuity of service on the sound sections.

An object of my invention is to provide improved electric circuit fault responsive apparatus wherein carrier current or the like is used to produce effects dependent on the instantaneous directions of the currents substantially independently of their relative magnitudes at two points of the circuit so as to eliminate the expense of certain more or less costly devices, such as pilot wires, potential transformers, and power directional relays. Another object of my invention is to provide an improved protective arrangement wherein the necessity for a multiplicity of carrier wave frequencies is eliminated and wherein improper operation due to a fault affecting the carrier channel is prevented. A further object of my invention is to provide a carrier current protective arrangement wherein duplicate transmitters and receivers, all operative on the same frequency, can be used to protect a polyphase circuit and wherein the necessary electromotive forces for the excitation of the carrier apparatus may all be derived from the circuit itself. These and other objects of my invention will appear in more detail hereinafter.

My invention will be better understood from the following description taken in connection with the accompanying drawings, and its scope will be pointed out in the appended claims.

Figure 5:
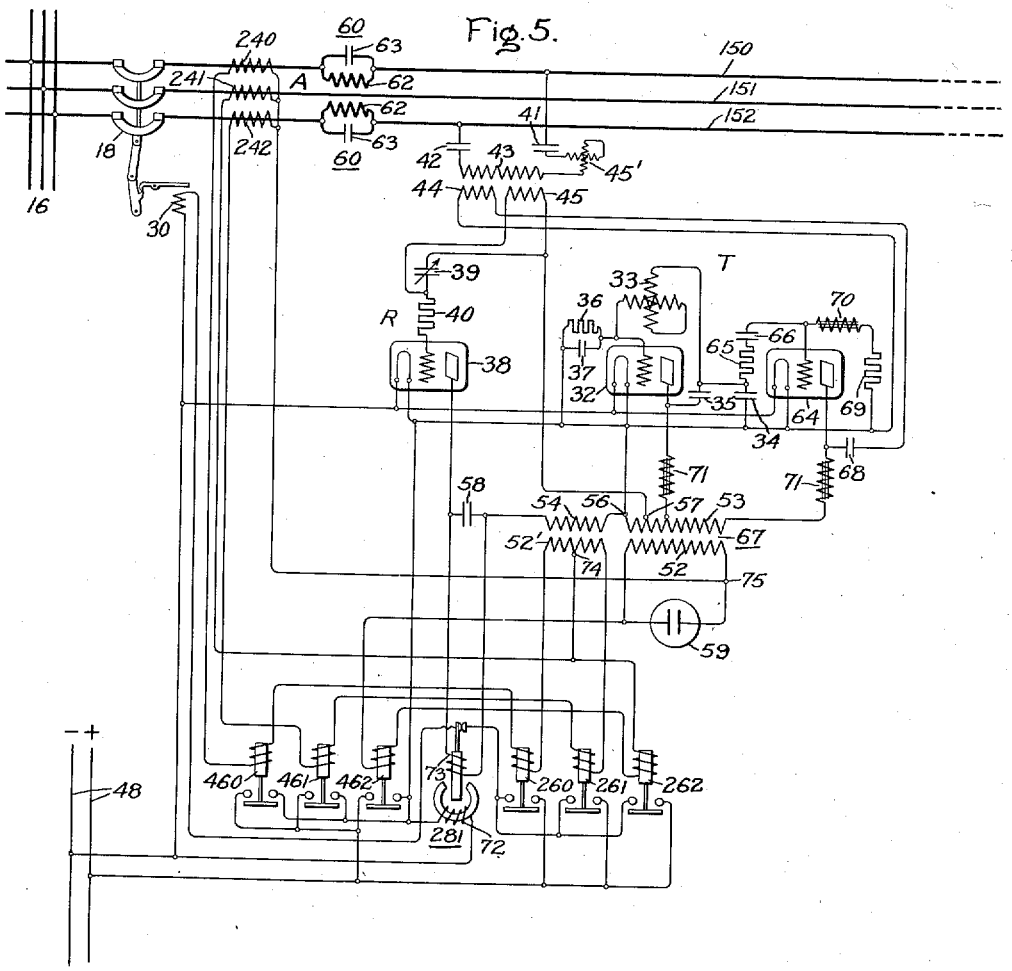
Figure 6:
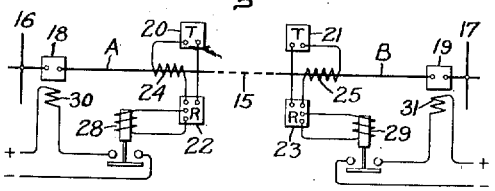
Figure 7:
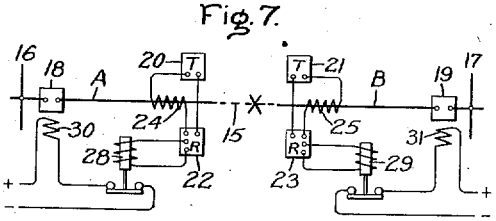
Figure 8:
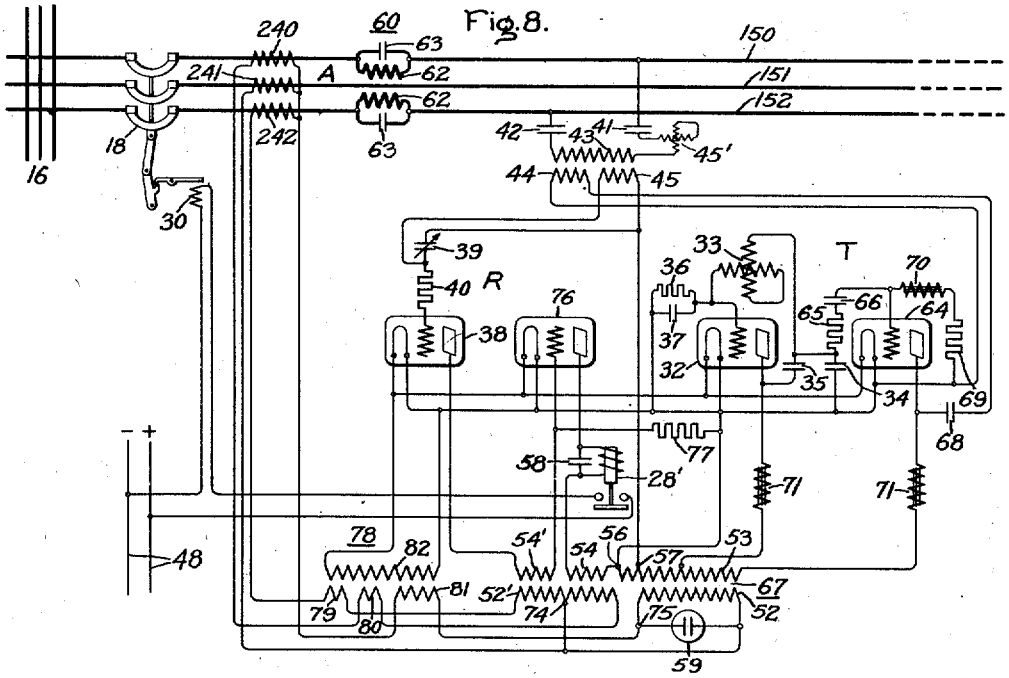
Figure 9:
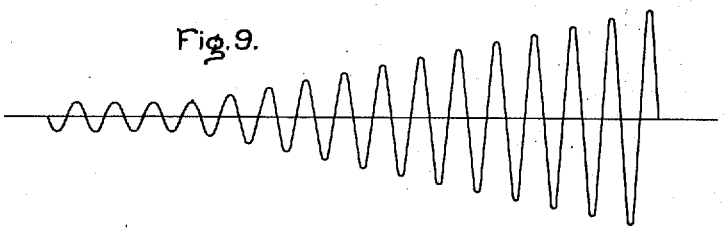
Figure 10:
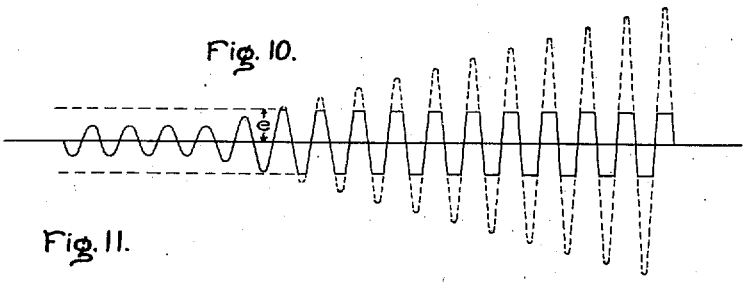
Figure 11:
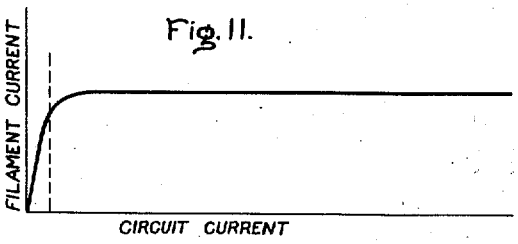

In the accompanying drawings, Fig. 1 illustrates schematically an embodiment of my invention in a section of an electric circuit, circuit conditions being assumed normal; Fig. 2 is similar to Fig. 1 except that abnormal conditions due to a through fault, that is, a fault external to the section, are assumed; Figs. 2*a* to 2*j* inclusive are wave forms explanatory of the operation of the embodiment of my invention shown in Fig. 1 under the conditions assumed in Fig. 2; Fig. 3 is similar to Fig. 1 except that abnormal conditions due to an internal fault, that is, a fault on the section, are assumed; Figs. 3*a* to 3*j* inclusive are wave forms explanatory of the operation of the embodiment of my invention shown in Fig. 1 under the conditions assumed in Fig. 3; Fig. 4 illustrates diagrammatically, in single phase for clearness, an embodiment of my invention according to Fig. 1; Fig. 5 illustrates an embodiment of my invention according to Fig. 1 in a polyphase system, the apparatus at only one end of the section being shown; Figs. 6 and 7 represent schematically another embodiment of my invention in a section of an electric circuit under abnormal conditions due to through and internal faults respectively; Fig. 8 illustrates diagrammatically a modification of my invention in a polyphase system, all necessary electromotive forces for the excitation of the carrier apparatus being derived from the circuit and the apparatus being shown for only one end of the section; Fig. 9 is a wave form illustrating the growth of circuit current in case of a fault from normal to several times normal; Fig. 10 is a wave form illustrating the operation of a potential regulating device for maintaining substantially constant grid and plate potentials on the carrier apparatus over a wide range of circuit current as shown in Fig. 9; and Fig. 11 represents a characteristic curve of a filament current transformer whose excitation is derived from the circuit current.

Referring now to the embodiment of my invention shown schematically in Figs. 1, 2 and 3, a section of an electric circuit which comprises a conductor 15, shown partly in broken line to give a conception of distance and extending between two stations 16 and 17, is provided with suitable circuit controlling means such as circuit interrupters 18, 19. These are arranged to be controlled in accordance with my invention by a discriminating action dependent on the instantaneous directions of the currents at two points, such as the ends A and B of the section. The apparatus for obtaining this action may be of the carrier current type and, as schematically shown, comprises, at the ends of the section, transmitters 20, 21 and receivers 22, 23. The receiver R at each end is tuned to the frequency of the transmitter T at the other end and, although different frequencies can be used, both of the transmitters 20, 21 may, in accordance with my invention, operate at the same frequency and the receivers 22, 23 be tuned accordingly. The transmitters and receivers, as will appear more in detail hereinafter, may be of the type comprising electron discharge tubes such as the three electrode thermionic type. In accordance with my invention, the plate and grid potentials are derived from the circuit current at the point where the transmitter and/or receiver is located through suitable means which may comprise current transformers 24, 25. The filament potential may be derived from the circuit current or from a separate source, as desired. While the tube filaments may have full potential on them during normal conditions, I prefer to have them energized at normal operating potential only on the occurrence of abnormal circuit conditions. This may be done, as will hereinafter appear, in the case of a separate source, by having means responsive to the abnormal circuit condition, such as over-current relays to control the filament circuits or, in case of excitation directly from the circuit current, through suitable transforming means.

In order to control the circuit of the section A, B, that is, to open one or both of the circuit interrupters 18, 19 only on the occurrence of an internal fault, I provide, in accordance with my invention, electroresponsive means herein shown as comprising over-current relays 26, 27, which cooperate with other relays 28, 29 controlled by the conjoint action of the transmitter T at one end and the receiver R at the other end to control, in the illustrated embodiment of my invention, contacts arranged in series in the circuits of the circuit interrupter trip coils 30, 31, although the relays may equally well cooperate to control suitable alarm or indicating devices.

The embodiment of my invention shown schematically in Figs. 1, 2 and 3 is based on principles comprising the following:

If a three electrode tube oscillator be furnished with an alternating plate voltage, it will oscillate intermittently and only during the half cycles when the plate is positive.

If the plate circuit of a receiving tube is supplied from an alternating current source, no current will pass during the half cycle when the plate is negative. Further, if a voltage of suitable magnitude and 180° out of phase with the plate supply be applied to the grid, the plate current may be stopped entirely, since the grid will have a negative bias when the plate is positive.

If there now be impressed on the grid an additional voltage of carrier frequency, a rectified current may be caused to flow in the plate circuit, but this can occur only during the half cycle when the plate is positive.

It is, therefore, possible in accordance with my invention, to have two transmitters at different points of a circuit operative to transmit alternately or simultaneously and only during alternate half cycles of the circuit currents at the points. It is also possible to have a receiver at each point operative to receive only during alternate half cycles of the circuit current at the point and also only when the transmitters are transmitting alternately.

It is believed that, prior to the consideration of specific embodiments of my invention, the operation, based on the principles outlined, will be more readily comprehended in connection with the schematic showing in Figs. 1, 2 and 3, and the wave forms of Figs. 2*a* to 2*j* inclusive and 3*a* to 3*j* inclusive. The latter figures are merely intended to be illustrative of relative phase relations and frequencies, and are not to be considered as representing the magnitudes of the quantities involved.

Under normal conditions, as shown in Fig. 1, the over-current or tripping relays 26, 27, which are preferably time delay devices, will be insufficiently energized to close their contacts and therefore the trip coil circuits are open. The receiver relays 28, 29, which are preferably substantially instantaneous devices, will be deenergized with their contacts closed, since the filaments of the tubes are not sufficiently energized to cause the operation of the transmitters 20, 21 or the receivers 22, 23.

Under abnormal conditions, such as a through fault, the circuit currents at each end of the section are substantially in phase, as shown in Figs. 2*a* and 2*b*, but the filaments of the tubes will be energized sufficiently to cause operation of the transmitters and receivers. The tube connections are such that, under these conditions, the transmitter plate and the receiver grid voltages derived from the circuit current at each end are substantially 180° out of phase with the transmitter plate and receiver grid voltages at the other end, as shown in Figs. 2*c* and 2*d*. Also, the plate voltage on the receiver at each end is substantially 180° out of phase with the plate voltage on the receiver at the other end, as shown in Figs. 2*e* and 2*h*, and substantially 180° out of phase with the transmitter plate and receiver grid voltages at its own end, as shown in Figs. 2*c* and 2*e*, and also in Figs. 2*d* and 2*h*. The transmitters 20, 21 are, therefore, operative to transmit only alternately and only during alternate half cycles of the circuit current, as shown in Figs. 2*c* and 2*i*, and also in Figs. 2*d* and 2*f*, since no plate current can pass when the plate voltage is negative. The wave transmitted by the transmitter at each end is impressed on the grid of the receiver at the other end, this wave being transmitted over any suitable channel, such as the circuit conductor 15, through suitable coupling thereto of the transmitters and receivers. Also, the receivers 22, 23 are operative to receive only alternately and only during alternate half cycles of the circuit currents, as shown in Figs. 2*e* and 2*h*, since no plate current can pass when the receiver plate voltage is negative. Consequently, the receiver 22 is not operative to receive when the transmitter 20 is operative to transmit, as shown in Figs. 2*e* and 2*i*, but the receiver 22 is operative to receive when the transmitter 21 is operative to transmit, as shown in Figs. 2*e*, 2*f* and 2*g*. Similarly, the receiver 23 is not operative to receive when the transmitter 21 is operative to transmit, as shown in Figs. 2*h* and 2*f*, but the receiver 23 is operative to receive when the transmitter 20 is operative to transmit, as shown in Figs. 2*h*, 2*i* and 2*j*.

Therefore, both of the receiver relays 28 and 29 are energized, and as they operate substantially instantaneously, they open their contacts in the circuits of the trip coils 30, 31 before the time relay tripping relays 26 and 27 close their contacts. Consequently, the circuit interrupters 18 and 19 remain closed as they should be when the fault is outside of the section of the circuit under consideration.

Under abnormal conditions, such as an internal fault as at X in Fig. 3, and assuming that the section is fed from both ends and that an effective carrier channel continues to exist between A and B, the circuit currents at the ends A and B of the section are substantially 180° out of phase, as shown in Figs. 3*a* and 3*b*, but the tubes will be energized sufficiently to cause operation of the transmitters and receivers. The transmitter plate and receiver grid voltages derived from the circuit current at each end are now substantially in phase with the transmitter plate and receiver grid voltages at the other end, as shown in Figs. 3*c* and 3*d*. Also, the plate voltage on the receiver at each end is substantially in phase with the plate voltage on the receiver at the other end, as shown in Figs. 3*e* and 3*h*, and substantially 180° out of phase with the transmitter plate and receiver grid voltages at its own end, as shown in Figs. 3*c* and 3*e* and also in Figs. 3*d* and 3*h*. The transmitters 20, 21 are, therefore, operative to transmit only simultaneously and only during alternate half cycles of the circuit current, as shown in Figs. 3*c* and 3*i*, and also in Figs. 3*d* and 3*f*, since no plate current can pass when the plate voltage is negative. Also, the receivers 22, 23 are operative to receive only simultaneously and only during alternate half cycles of the circuit current, as shown in Figs. 3*e* and 3*h*, since no plate current can pass when the receiver plate voltage is negative. Consequently, the receivers are blocked, that is, not operative to receive when the transmitters are transmitting, as shown in Figs. 3*e*, 3*f* and 3*g*, and Figs. 3*h*, 3*i* and 3*j*.

Therefore, the receiver relays 28 and 29 remain deenergized with their contacts closed. Consequently, as soon as the relays 26, 27 close their contacts, the circuit breakers 18 and 19 are tripped as they should be when the fault is on the section of the circuit under consideration.

If, on the other hand, a fault causes interruption of the carrier channel, it is obvious that the receivers will not be actuated and the circuit interrupters are opened.

Under abnormal conditions, such as an internal fault as at X in Fig. 3, and assuming that the section is fed from only one end, for example station 16, then only the transmitter and receiver at A will be set into operation. The receiver at A can not be actuated by either the transmitter at B, since the latter is not set into operation or the transmitter at A, for the transmitter and receiver plate voltages at A are 180° out of phase, as shown in Figs. 3*c* and 3*e*, and they can not function simultaneously. Consequently, the receiver relay 28 is not energized, but the tripping relay 26 is, and in closing its contacts, effects the opening of the circuit interrupter 18. This disconnects the fault from the live portion of the circuit, as desired. It will be obvious to those skilled in the art that this single end feed condition may, in effect, occur on a circuit normally fed from both ends, if, for example, a circuit conductor should break close to an insulator.

Referring now to the embodiment of my invention shown in Fig. 4, there is carrier apparatus comprising a transmitter T and a receiver R at each of the ends A, B of the circuit section 16—17 of the conductor 15. The transmitters T may both be the same and of any suitable type. They are shown as comprising an oscillator tube 32, a tuning unit such as a variable inductance 33, a condenser 34, a plate blocking condenser 35, and a grid biasing means comprising a resistance 36 and a condenser 37. The receivers R may both be the same, and are herein shown as comprising a detector tube 38, a tuning unit such as a variable condenser 39, and current limiting means, such as a resistance 40 in the grid circuit. The plate circuit of the transmitter tube 32 and the grid circuit of the receiver tube 38 are coupled to the carrier channel, herein shown as comprising the conductor 15 and ground through suitable adjustable tuning means which are illustrated as comprising condensers 41 and 42, a transformer having windings 43, 44, 45, and a tuning device such as a variable reactance 45′. The plate circuit of the transmitter tube is connected to the winding 44 and the grid circuit of the receiver tube is connected to the winding 45. The transmitters and receivers may be equipped with amplifiers for increased output in a manner known to the art, but as the showing of these would complicate the drawings, they are omitted for clearness.

For starting the transmitters and receivers on the occurrence of abnormal circuit conditions, suitable means responsive to such conditions, such as over-current starting relays 46, 47 are provided. These relays are arranged to be energized in accordance with the current in the conductor 15 at the respective points A, B, and for this purpose may be connected in circuit with the current transformers 24 and 25. The starting relays 46, 47 are preferably substantially instantaneous in action, and are preferably set to pick-up at a smaller value of current than the tripping relays 26, 27, so as to have the transmitters and receivers positively in operation before the tripping relays can operate to close their contacts. The tripping relays may be definite time limit devices. The starting relays are arranged to connect the filaments of the tubes 32 and 38 to any suitable sources of electric current, such as busses 48, 49. In case it is desirable to have quicker action on the occurrence of faults, the time-lag in the operation of the transmitters and receivers, because of the heating period of the tube filaments, may be considerably reduced by normally running the tube filaments at a suitable temperature, instead of having them cold. This may be accomplished in any suitable manner, such as having by-pass resistances 50, 51 connected across the contacts of the starting relays 46, 47 respectively, and adjusted to pass the necessary current when the starting relay contacts are open. In this way, the tubes may be run continuously at a filament temperature and emissivity below normal, thereby obtaining the advantages of quicker operation with a longer tube life than if the tubes were operated continuously at normal operating filament temperature.

For deriving suitable electrode potentials, that is, energizing the plate and grid circuits of the transmitter and receiver tubes in accordance with the instantaneous phase relation of the currents at the two points A and B, as heretofore described in connection with Figs. 2*a* to 2*j* inclusive and 3*a* to 3*j* inclusive, I provide suitable means such as a transformer 67 having a winding 52 connected in series relation with the conductor 15 through suitable means such as the current transformers 24, 25, the polarities at B being the reverse of those at A. The plate and grid voltages are obtained from the secondary winding sections 53, 54 of these transformers 67. The plate voltage of the transmitter tube 32 is that on the winding section 53, which may have a by-pass or filter condenser 55 connected across it. The plate voltage on the receiver tube 38 is that on the winding section 54. The local biasing grid voltage, as distinguished from the transmitted or impressed grid voltage on the receiver tube, is that between the points 56 and 57 of the winding section 53. The incoming or impressed grid voltage on the receiver tube 38 is that on the winding 45 of the coupling transformer. The windings of the receiver relays 28, 29 are connected in the plate or output circuit of the receiving tubes 38 and by-pass or filtering condensers 58 may be connected across the relay windings to steady the relay operation. The value of this condenser may be so chosen, if desired, that a slight time delay in the dropout of the relay is introduced, thus insuring that when the over-current ceases, relays 28, 29, will not close their contacts until relays 26, 27 have opened.

Fault responsive apparatus for protecting an electric circuit must operate over a wide range of current values. The apparatus should desirably be capable of functioning at currents of the order of full load, yet must sustain without damage and operate properly at the heaviest possible overload which, in some cases, may be as much as twenty times normal load. Over such a wide range in current values, it will be obvious that the voltage on the winding 52 of the transformer 67 would vary exceedingly with possible damage to or crippling of the transmitters and receivers. In order to avoid this trouble, I provide, in accordance with my invention, means for maintaining substantially constant electrode potentials over a relatively extended range in the circuit current. As shown, this means may comprise a voltage regulating glow tube 59 which is capable of controlling relatively large amounts of power and which is connected across the winding 52. This tube may be of the gas-filled type containing helium. The operation of the tube will be clearer from the consideration of the wave forms shown in Figs. 9 and 10. Fig. 9 represents, from left to right, the growth of circuit current from normal to several times normal and how the voltages would vary on the transmitter and receiver tubes, if it were not for the glow tubes 59. Fig. 10 illustrates the behavior of the glow tube 59, which breaks down and passes current at a potential *e* corresponding, for example, to twice normal load. Above the break-down or discharge point, the glow tube impedance decreases with increase in current, and the voltage on the receiver and transmitter tubes, instead of following the dotted line wave form, has the peaks cut off and follows the solid line wave form which is more or less rectangular and of definite peak value. This feature is particularly suitable to the principles underlying my invention, inasmuch as the wave form and amplitude are of subordinate importance. Of greater importance are the exact instants at which transmission is commenced and terminated, that is, when the line current passes through the zero value.

In order to prevent improper operation of the circuit controlling means 18, 19 on the occurrence of a fault external to the section 16, 17 to be protected, but near an end thereof, such as a fault to ground at Y in an adjacent section and near the station 16, I provide means for controlling the path of the carrier current so as substantially to confine the transmitted carrier waves to the section in which they originate. This means, as shown, comprises traps 60, 61 connected in the carrier channel near the ends of the section but external to the portion of section between the points of coupling. These traps are of high impedance to carrier frequencies but do not present appreciable impedance to currents of power frequencies. They may comprise plain choke coils having suitable numbers of turns or as shown they may each comprise a parallel-connected inductance 62 and capacitance 63 tuned substantially to the frequency of the transmitter to which it is adjacent. This prevents faults, elsewhere than on the section protected, from by-passing or short-circuiting the carrier wave or output of the adjacent transmitter whereby carrier current would fail to reach the remote receiver and thus fail to prevent the opening of the circuit. The ideal trap circuit would, of course, pass all power currents and stop entirely all carrier currents of the frequency to which it is tuned. While this ideal is theoretically possible, it is not necessary to satisfactory operation of my invention, the main point being that it is necessary to have the impedance of the trap relatively to the impedance of the carrier channel sufficient to prevent a fault in an adjacent section from by-passing enough carrier current to prevent operation of the receiver for which the carrier current is intended.

In Fig. 5, I have shown an embodiment of my invention as applied to one end of a section of a three phase circuit comprising conductors 150, 151 and 152. The other end of the section will be similarly equipped except that the carrier apparatus will be connected to the current transformers in the respective circuit conductors for reverse polarities as indicated in Figs. 2*c*, 2*d*, 2*e* and 2*h*. In this embodiment of my invention the transmitters T and the receivers R are coupled to two of the circuit conductors 150, 152 which form the carrier channel, each of the conductors being provided with a trap 60 as heretofore described. While my invention is intended to take care of an electric circuit without the necessity of using any pilot or other special conductors, this being the purpose for coupling carrier apparatus to the circuit conductors, the application of my invention is not so limited. In case there should exist between the two stations at the extremities of the circuit section, conductors such as telephone or other connections or control circuits, I may couple the carrier apparatus to such circuits rather than to the power line conductors if by so doing economy in coupling, carrier traps, etc., should result. Moreover, in case a plurality of parallel lines were protected by this means, the respective carrier current control channels may all reside in such conductors by suitable means, examples of which are known to the art of carrier current transmission. Furthermore, my invention may be carried into effect in precisely the same manner by space transmission of the carrier wave.

The receiver R of Fig. 5 may be and is shown as in Fig. 4 while the transmitter T comprises in addition to the oscillator tube 32, an amplifier unit comprising a triode 64, a current limiting device such as a resistance 65 in the grid circuit, a grid coupling condenser 66, a plate blocking condenser 68, a grid leak 69, and a grid choke 70. Chokes 71 may be provided to keep high frequency currents out of the transformer 67. The plate voltage of the amplifier tube is derived from the winding section 53 of the transformer 67.

In the circuit under consideration, protection must be assured under seven possible fault conditions, viz: a fault involving all three phase conductors commonly called a three-phase short, a phase to phase fault between any two phase conductors, and a fault to ground on any phase conductor. The severity of the conditions accompanying the fault may vary considerably depending on whether the fault is an interphase or a ground fault. In the latter case the ground fault current may not be sufficient relatively to the load current, particularly if the system has a neutral grounded through a current limiting device, to cause a reversal of current at one of the points where the fault responsive apparatus is located.

In order therefore to take care of all these conditions, I provide current transformers 240, 241 and 242, one in each phase conductor, two interphase fault starting relays 460, 461, a ground fault starting relay 462, two interphase fault tripping relays 260, 261, a ground fault tripping relay 262 and a receiver relay 281. The starting relays have their contacts connected in parallel with each other and in series with the tube filament circuit which is supplied from the bus 48. The tripping relays have their contacts connected in parallel with each other and in series with the contacts of the receiver relay 281 in the circuit of the trip coil 30. The receiver relay 281 as shown is of the polarized type comprising a polarizing winding 72 arranged to be connected to the bus 48 through the contacts of any one of the starting relays and a cooperating winding 73 connected in the output or plate circuit of the receiver tube 38 so as to be controlled by the receiver R. The receiver relay 281 may, for example, be of the type disclosed in Letters Patent, 1,541,618 of the United States issued to Harold W. Brown, June 9, 1925, and assigned to the same assignee as this invention.

In order to obtain suitable electrode potentials for the transmitter and the receiver tubes under all fault conditions, the transformer 67 is provided with another primary winding 52′ magnetically interlinked with the others. The midpoint 74 of this winding constitutes a neutral point for one side of the current transformers 240, 241 and 242. Between this point 74 and the point 75 which may be considered as the neutral point of the other side of the current transformers, are connected in series the windings of the ground fault starting and tripping relays 462 and 262 and the transformer winding 52 in parallel with which is connected the glow tube 59. With this arrangement the transformer winding 52 and the glow tube 59 will be energized directly by the vector sum of the currents, that is in accordance with the ground fault current when such exists, but in case of interphase faults by transformation. Although the primary or circuit current at which the glow tube comes into operation will vary according to the nature of the fault, it will always regulate all the electrode potentials at their appropriate maximum value. In order to obtain greater sensitivity on ground faults the winding 52 may have more turns than the winding 52′. For the same purpose the ground fault starting and tripping relays may be set more sensitively than the corresponding phase fault relays. As before the starting relays are set to operate at lower values of primary currents than are the tripping relays.

In case of a fault on the circuit inside or outside of the section, one or more of the phase fault and/or ground fault starting relays will be energized and thereby effect the energization of the transmitter and receiver at each end. If the fault is on the section, the receiver at each end will not operate to energize the winding 73 of the receiver relay 281 whose contacts remain closed since it takes the coaction of both windings of this relay to cause it to function. Therefore, when one of the tripping relays at each end closes its contacts, the corresponding circuit breaker is opened. If the fault is outside the section the receiver will operate to energize the winding 73 whose contacts open thereby preventing the opening of the circuit breakers. Bearing in mind the explanation in connection with Figs. 1, 2 and 3, it will be observed that the circuit section will be disconnected in case of an internal fault not only when the carrier channel remains intact but also when the fault involves the phase conductors to which the carrier apparatus is coupled.

Figs. 6 and 7 represent schematically a modification of my invention under through and internal fault conditions respectively. In this case, the polarities of the connections of the transmitter and receiver at the ends of the section relative to the directions of circuit current are such that when the current is in the same direction at each end, both transmitters are transmitting simultaneously but the receivers are unable to receive as shown in Figs 3*a* to 3*j* inclusive. The tripping relays are omitted and control of the trip coils 30, 31 is invested solely in the receiver relays 28 and 29 respectively. On the occurrence of a fault on the section as at X in Fig. 7, the transmitters operate alternately and the receiver at each end can receive only when the transmitter at the other end is transmitting as shown in Figs. 2*a* to 2*j* inclusive. Consequently the receiver relays 28, 29 are actuated to close their contacts thereby effecting the opening of the circuit interrupters 18, 19. The details of the arrangement of carrier apparatus, etc., for the embodiment of my invention shown in Figs. 6 and 7 will be obvious from Figs. 4 and 5. In cases where continuity of service is considered of prime importance, rather than disconnection of the circuit due to failure of apparatus, the scheme shown in Figs. 6 and 7 may be employed because in this arrangement failure of the carrier apparatus or channel will not cause the opening of the circuit on through faults. It will be obvious, that in this arrangement effective reception of the carrier wave causes the opening of the circuit instead of preventing the opening of the circuit.

In the modification of my invention shown in Fig. 8, the reception of carrier stops instead of starts, as heretofore, the current in the receiver relay 28′ which is in effect an over-current relay. For this purpose, suitable means such as a two tube receiver R comprising the receiver tube 38 and a control tube 76 may be used. An arrangement of this kind is naturally more sensitive than a single tube receiver. Accordingly I provide an additional secondary winding 54′ on the transformer 67 since two entirely separate plate voltages are required. The tube 38 forms the ordinary bias receiver heretofore described, the negative bias for the grid being the voltage across the taps 56, 57 of the windings 53—54. This voltage is of opposite polarity to the voltage across the winding 54′. As in Fig. 5, the filaments are connected to the tap 56 of the transformer 67.

The complete connections for only one end of the section are given but it will be understood that the apparatus at the other end is the same except for the reverse polarity connections as heretofore pointed out. In the arrangement shown, it will be observed that the glow tube 59 is connected, as in Fig. 5, across the ground fault winding 52 only. It should be noted, as heretofore pointed out that, inasmuch as the phase fault winding 52′ and the ground fault winding 52 are associated with the same magnetic circuit, the glow tube 59 is energized by all kinds of faults. While, therefore, the primary or circuit current at which the glow tube comes into operation will vary according to the nature of the fault, the glow tube will always regulate the plate and grid voltages at the appropriate values corresponding to the turns on the several windings.

In this embodiment of my invention, the control tube plate voltage, that is, the voltage on the winding section 54 of the transformer, is dependent on the circuit current and the control tube grid is normally at filament potential. Consequently, the control tube 76 produces a plate or output current during positive half cycles of its plate voltage. The receiver relay 28′, therefore, picks up on over-current and is in effect an over-current relay so long as the grid is at filament potential.

When the incoming carrier wave transmitted from the transmitter at the other end of the section reaches the grid of the receiver tube 38 at the instant when its plate voltage is positive, as in the case of through faults, this tube passes plate current. This, going through a resistance 77, applies a negative bias to the control tube 76 and stops its plate or output current which tends to flow into the winding of the receiver relay 28 during positive half cycles of the circuit current. The reception of carrier, in stopping the plate current in the control tube, prevents the receiver relay 28 from operating. On the occurrence of a fault on the section, since the receiver tube is blocked when the transmitters are operative to transmit, as heretofore pointed out, no receiver tube plate current is available to bias the control tube 76 to a point where its output or plate current is stopped. Consequently, the receiver relay 28 is energized and the circuit interrupter 18 thereby opened.

An arrangement, embodying the features just described, has several advantages in that the use of two tubes makes available an amplifying effect whereby greater currents are available with a weak carrier signal. Moreover, the receiver relay current is now zero when the carrier is received, that is, when the primary currents at the ends of the section are in phase and the line is sound. No phase variation will be apt to occur under this condition. When a fault such that the currents at the ends of the section are 180° out of phase occurs, the relay current will be a maximum. If the phase difference is not exactly 180°, there may be a slight reduction in the relay current, but this will not prevent the relay 28 from being set to pick up at currents very much less than the value envisaged for normal operation. Consequently, certainty of operation may be obtained without the liability of improper operation, if the phase difference of the fault currents is not substantially 180°.

While in the arrangement shown in Fig. 8, operation may be initiated as heretofore by having the tube filament energized from a bus 48 and controlled by the starting relays, I have shown means whereby the filaments may be energized directly from the circuit current. This means comprises, as shown, a filament transformer 78 having primary windings 79, 80, 81 connected in series relation with the circuit through suitable means such as the current transformers 240, 241, 242 and a secondary winding 82 to which the filament circuits are connected. While in the arrangement shown the tube filaments are connected in parallel across the terminals of the winding 82, it will be obvious that the winding may be suitably tapped for whatever filament voltages are desirable or necessary for the tubes used. By drawing the filament supply directly from the primary or circuit current, as is done in the case of the plate and grid circuits, it is possible not only to obtain a more simple and reliable system, but also to avoid any question as to difference between the filament excitations at the ends of the section under through fault conditions because the currents are substantially identical.

The primary or ground fault winding 81 of the filament transformer 78 is connected to be energized in accordance with the vector sum of the currents in the phase conductors 150, 151, 152. For this purpose, it may be connected between the neutral points, as is the ground fault winding 52 of the plate grid transformer. The primary or phase fault windings 79 and 80 are connected to be energized respectively in accordance with the currents in two of the phase conductors. For this purpose, they may be connected in series with the current transformers 242 and 240 in a manner similar to the connections for the sections of the phase fault winding 52′ of the transformer 67. By properly proportioning the number of turns in the primary windings, the tube filaments may be energized to bring the transmitters and receivers into operation on the occurrence of abnormal circuit conditions causing current above a predetermined value. For example, the transformer 78 may furnish sufficient current to operate the tubes when the primary or circuit current is of the order of full load, but between this value and the maximum contemplated overload, twenty times normal load, the filament excitation should remain constant. Inasmuch as the heating effect or the amount of the secondary current, rather than wave form, is the main consideration, I have used a transformer arranged to saturate at some predetermined value of circuit current and having a substantially flat characteristic such as shown in Fig. 11. The dotted line may indicate, for example, the value of primary or circuit current at which the filament excitation or emissivity is sufficient to cause the transmitter and receiver to operate.

It will be apparent that the relay 28′ will have the characteristics of a time delay device due to the brief period necessary to bring the filaments to the emission temperature. Consequently, the relay will not pick up on transients, such as steep wave fronts, or other instantaneous disturbances. In this arrangement, where separate over-current tripping relays are not used, operation of the transmitters should precede that of the receivers. This is in order that the relay 28′ shall remain open on the occurrence of a through fault. If the proper sequence is not obtained, the relay 28′ may make one transient contact. This is immaterial if separate tripping relays are used, but should be avoided if they are omitted. This sequence is governed by the filament circuit characteristics, which can be suitably controlled, as for example, by choosing tubes whose filaments have the desired thermal time constants, or by retarding the heating of the receiver filaments or accelerating the heating of the transmitter filaments by any suitable means.

While I have shown and described several embodiments of my invention, I do not desire to be limited to the exact arrangements shown and described, but seek to cover in the appended claims all those modifications that fall within the true spirit and scope of my invention.

What I claim as new and desire to secure by Letters Patent of the United States, is:—

1. In a protective arrangement for an electric circuit, circuit controlling means for said circuit, carrier current apparatus for controlling said circuit controlling means including a transmitter located at one point of the circuit and a receiver therefor located at another point of said circuit said apparatus being arranged so that said circuit controlling means operates to open the circuit whenever said receiver fails to receive and the current in the circuit at the point where the receiver is located is above a predetermined value.

2. In a protective arrangement for an electric circuit, circuit controlling means for said circuit, carrier current apparatus for controlling said circuit controlling means, including a transmitter located at one point of the circuit and a receiver therefor located at another point of said circuit, a relay for controlling said circuit controlling means connected to operate in accordance with the current in said circuit at the point where the receiver is located and means for preventing said relay from operating said circuit controlling means whenever said receiver is receiving from said transmitter.

3. A protective arrangement for an electric circuit including means for controlling the circuit, a relay for controlling said circuit controlling means, and means for controlling said relay including carrier current apparatus including a transmitter at one point of the circuit and a receiver therefor at another point of the circuit, said receiver including means for energizing the relay in accordance with the current in the circuit at the point where the receiver is located, and means for preventing the energization of the relay whenever the receiver is receiving from the transmitter.

4. In a protective arrangement for an electric circuit, circuit controlling means for said circuit, carrier current apparatus for controlling said circuit controlling means coupled to a conductor of the circuit and including a transmitter located at one point of the circuit and a receiver therefor located at another point of the circuit, said apparatus being arranged so that said circuit controlling means operates to open the circuit whenever said receiver fails to receive due to a fault involving said conductor, and the current in the circuit at the point where the receiver is located is above a predetermined value.

5. A protective arrangement for an alternating current circuit including means at one point of the circuit operative to transmit a carrier wave of a predetermined frequency only during alternate half cycles of the circuit current at said point, means at another point of the circuit operative to receive said carrier wave only during alternate half cycles of the circuit current at said other point, and electroresponsive means controlled by the conjoint action of said transmitting and receiving means.

6. A protective arrangement for a section of an electric circuit including means at one end of the section operative to interrupt the circuit in response to the circuit current at said end when in excess of a predetermined value, and means for preventing the operation of said interrupting means under a predetermined relation between the directions of energy flow at the ends of the section including means connected to be energized in accordance with the current at the other end of the section.

7. In a protective arrangement for an alternating current circuit, circuit controlling means and means for controlling said circuit controlling means on the occurrence of abnormal circuit conditions including carrier current apparatus including a transmitter and a receiver tuned to the frequency thereof, each being connected and arranged to be operative during the positive half cycle of the circuit current and inoperative during the negative half cycle.

8. In a protective arrangement for a system of distribution adapted to have an alternating current supplied thereto, carrier current apparatus including a transmitter and a receiver tuned to the frequency therof, each being connected and arranged to be operative during one half cycle of said alternating current and inoperative during alternate half cycles.

9. In a protective arrangement for an alternating current circuit, carrier current apparatus including a transmitter and a receiver tuned to the frequency thereof, each being connected and arranged to be operative during the positive half cycle of the circuit current and inoperative during the negative half cycle.

10. In combination with an electric circuit, an oscillation transmitter at one point of the circuit and a receiver at another point tuned to the transmitter, said transmitter and receiver being connected and arranged to be operative alternately when a predetermined phase relation exists between two voltages respectively derived from the circuit at said points and simultaneously when a different phase relation exists between said voltages.

11. A protective arrangement for a section of an electric circuit, including circuit interrupting means, and means for controlling the circuit interrupting means in accordance with the instantaneous directions of the currents at two points of the circuit including a high frequency transmitter and a receiver tuned to the frequency thereof, said transmitter and receiver being connected and arranged to be operative alternately when a predetermined relation exists between the directions of the current at said points and simultaneously when a different relation exists between the directions of the current at said points.

12. A protective arrangement for an alternating current circuit including means at one point of the circuit operative to transmit a carrier wave of a predetermined frequency only during alternate half cycles of the circuit current at said point, means at another point of the circuit operative to receive said carrier wave only during alternate half cycles of the current at said other point, and circuit controlling means arranged to be controlled by the receiving means.

13. An electric circuit protective arrangement including a high frequency transmitter at one point of the circuit and a receiver at another point of the circuit tuned to the frequency of the transmitter and means for controlling said transmitter and said receiver in accordance with circuit conditions to cause the transmitter and receiver to be operative simultaneously only when the currents at the two points are in phase.

14. In a protective arrangement for a section of an electric circuit, circuit controlling means, and means for controlling said circuit controlling means on the occurrence of abnormal circuit conditions, including a plurality of transmitters connected and arranged to be controlled by the circuit current so as to transmit alternately on the occurrence of a fault on the circuit external to said section and to transmit simultaneously on the occurrence of a fault on the circuit within said section.

15. In a protective arrangement for a section of an electric circuit, circuit controlling means, means for controlling said circuit controlling means on the occurrence of abnormal circuit conditions, including a plurality of transmitters connected and arranged to be controlled by the circuit current so as to transmit alternately on the occurrence of a fault on the circuit external to said section and to transmit simultaneously on the occurrence of a fault on the circuit within said section, and receivers tuned to the frequency of said transmitters and controlled by the circuit current to prevent the opening of said circuit controlling means when the transmitters are transmitting alternately.

16. In a protective arrangement for an electric circuit, a transmitter at each of two points of the circuit, said transmitters being controlled by the circuit current so as to transmit alternately when the circuit currents at the two points are in substantially the same direction and to transmit simultaneously when the circuit currents at the two points are in opposite directions.

17. In a protective arrangement for an electric circuit, a transmitter at each of two points of the circuit, said transmitters being controlled by the circuit current so as to transmit alternately when the circuit currents at the two points are in substantially the same direction and to transmit simultaneously when the circuit currents at the two points are in opposite directions, and receivers at each of said points, the receiver at each point being tuned to the frequency of the transmitter at the other point and being controlled by the circuit current at the point so as to receive from the transmitter at the other point only when the transmitters are transmitting alternately.

18. In a protective arrangement for a section of an electric circuit, a transmitter at each of two points of the circuit, said transmitters being controlled by the circuit current so as to transmit alternately on the occurrence of a fault on the circuit external to said section and to transmit simultaneously on the occurrence of a fault on the circuit within said section.

19. In a protective arrangement for a section of an electric circuit, a transmitter at each of two points of the circuit, said transmitters being controlled by the circuit current so as to transmit alternately on the occurrence of a fault on the circuit external to said section and to transmit simultaneously on the occurrence of a fault on the circuit within said section, and means for controlling the circuit including a receiver at each point tuned to the frequency of the transmitter at the other point, said receivers being arranged to receive from the transmitter at the other point only when the transmitters are transmitting alternately.

20. An electric circuit protective arrangement including circuit interrupting means at one point of the circuit, and means for controlling said interrupting means in accordance with the instantaneous directional relation between the circuit currents independently of their relative magnitudes, at two points of the circuit including carrier current apparatus including a transmitter at one point of the circuit and a receiver at another point, said transmitter and receiver being connected and arranged to be operative alternately when a predetermined relation exists between the directions of the circuit current at the two points and simultaneously when a different relation exists between the directions of the circuit current at the two points.

21. A protective arrangement for a section of an electric circuit including circuit controlling means, means for controlling said circuit controlling means in accordance with the instantaneous directions of the currents at two points of the circuit including a carrier current transmitter and a receiver tuned to the frequency thereof, said transmitter and receiver being coupled to the circuit and arranged to have their operation controlled in accordance with the currents at the respective points, and means for substantially confining the carrier current wave to said section including traps connected in the circuit near each end of the section whereby to prevent improper operation of the circuit controlling means on the occurrence of a fault external to the section but near an end thereof.

22. In a protective arrangement for an alternating current circuit, carrier current apparatus including a transmitter and a receiver at each of two points of the circuit, both of the transmitters being arranged to transmit at substantially the same frequency only during alternate half cycles of the circuit currents at the respective points and said receivers being tuned to said transmitters and operative to receive only during alternate half cycles of the circuit currents at the respective points, the circuit for the carrier currents including one of the conductors to which the transmitters and receivers are coupled and traps connected in said conductor external to the portion of the circuit between the coupling connections for controlling the path of the carrier current.

23. In a protective arrangement for an alternating current circuit, carrier current apparatus including a transmitter and a receiver at each of two points of the circuit, both of the transmitters being arranged to transmit at substantially the same frequency only during alternate half cycles of the circuit currents at the respective points and said receivers being tuned to said transmitters and operative to receive only during alternate half cycles of the circuit currents at the respective points, the circuit for the carrier currents including two of the circuit conductors to which the transmitters and receivers are coupled, and an electroresponsive device at each of said points controlled by the conjoint action of the transmitter at one point and the receiver at the other point.

24. An electric circuit protective arrangement including a plurality of electron discharge devices including a transmitter and a receiver tuned thereto, said transmitter and receiver being connected and arranged to have their operation controlled respectively in accordance with the currents at two points of the circuit, and means including a glow tube for deriving from the circuit current at said points and maintaining on one of the electrodes of one of said electron discharge devices a substantially constant potential over a relatively extended range in the magnitude of the circuit current.

25. An electric circuit protective arrangement including a plurality of electron discharge devices including a transmitter and a receiver tuned thereto, said transmitter and receiver being connected and arranged to have their operation controlled respectively in accordance with the instantaneous directions of the circuit current at two points, means including a winding connected in series relation with the circuit for deriving therefrom electrode potentials for one of the electron discharge devices, and voltage regulating means for maintaining said potentials substantially constant.

26. A protective arrangement for an alternating current circuit including circuit controlling means and means for controlling said circuit controlling means in accordance with the instantaneous directions of the circuit current at two points of the circuit including a plurality of electron discharge devices, including a transmitter and a receiver tuned thereto, and means including a winding connected in series relation with the circuit for deriving therefrom electrode potentials for one of the electron discharge devices, and voltage regulating means including a glow tube connected in circuit with said winding for holding said potentials below predetermined values.

27. An electric circuit, circuit controlling means therefor, carrier current apparatus for controlling said circuit controlling means including a transmitter located at one point of the circuit and a receiver tuned only to the frequency of said transmitter and located at another point of the circuit and means for effecting a circuit opening operation of said circuit controlling means on the occurrence of a fault when carrier current transmission is interrupted.

28. An electric circuit, circuit controlling means therefor, carrier current apparatus for controlling said circuit controlling means including a transmitter located at one point of the circuit and a receiver tuned only to the frequency of said transmitter and located at another point of the circuit and fault responsive means for effecting a circuit controlling operation of said circuit controlling means when said receiver fails to receive from said transmitter.

29. An electric circuit, circuit interrupting means therefor and means for controlling said circuit interrupting means including fault responsive means associated with said circuit interrupting means and connected to be energized from said circuit for effecting a circuit controlling operation of the circuit interrupting means on the occurrence of a fault on the circuit, means for transmitting under predetermined circuit conditions current from another point of the circuit to the point where said fault responsive means is located and means connected to be controlled by said transmitted current in accordance with the relation between the directions of energy flow at said points for preventing said fault responsive means from effecting a circuit controlling operation of said circuit interrupting means when the fault occurs outside of the portion of the circuit between said points.

30. A protective arrangement for an electric circuit including circuit interrupting means at one end of a section of the circuit, fault responsive means connected to be energized from said circuit for effecting a circuit opening operation of said interrupting means on the occurrence of a fault on the circuit, means for transmitting under a predetermined circuit condition current from the other end of said circuit section to said one end, and means connected to be controlled by said transmitted current in accordance with the directions of energy flow at the ends of said circuit section for preventing said fault responsive means from effecting a circuit opening operation of said circuit interrupting means when the fault is outside of said circuit section.

31. An electric circuit, circuit interrupting means therefor and means for controlling said circuit interrupting means including fault responsive means associated with said circuit interrupting means and connected to be energized from said circuit for effecting a circuit opening operation of the circuit interrupting means on the occurrence of a fault on the circuit, means connected to be controlled in accordance with a predetermined condition of the circuit for transmitting current from another point of the circuit to a point adjacent said fault responsive means, means connected to operate in response to said transmitted current when a predetermined relation exists between the directions of energy flow at said points for preventing said fault responsive means from effecting a circuit opening operation of said circuit interrupting means when the fault is external to the portion of the circuit between said points.

32. An electric circuit, circuit interrupting means therefor, controlling means associated with said circuit interrupting means and connected to be energized from said circuit for controlling the circuit interrupting means on the occurrence of abnormal circuit conditions, means for transmitting under predetermined circuit conditions current from another point of the circuit to the point where said controlling means is located and means connected to be controlled by said transmitted current in accordance with the relative directions of energy flow at said points for preventing said controlling means from controlling said circuit interrupting means when the fault occurs outside of the portion of the circuit between said points.

33. A protective arrangement for an electric circuit including circuit interrupting means at one end of a section of the circuit, fault responsive means connected to be energized from said circuit for effecting a circuit opening operation of said interrupting means on the occurrence of a fault on the circuit, means at the other end of said circuit section for transmitting an oscillation of a predetermined frequency to said one end under a predetermined circuit condition, receiving means at said one end tuned to the frequency of said transmitting means and means controlled by said receiving means when the fault is outside of said circuit section for preventing said fault responsive means from effecting the opening of said circuit interrupting means.

34. A protective arrangement for an electric circuit including circuit interrupting means at one point of the circuit, means for effecting a circuit opening operation of said interrupting means, means at another point of said circuit section operative in accordance with a voltage derived from the circuit for transmitting an oscillation of a predetermined frequency to said one point, receiving means at said one point operative in accordance with a voltage derived from the circuit and tuned to the frequency of said transmitting means, and means controlled by said receiving means in accordance with the phase relation between the instantaneous values of said derived voltages for controlling the operation of said circuit interrupting means.

35. In a protective arrangement for an electric system adapted to have an alternating current supplied thereto, an oscillation transmitter and a receiver tuned to the frequency thereof, each being connected and arranged to operate during a half cycle of a voltage derived from said circuit and to be inoperative during alternate half cycles of said derived voltage.

36. A protective arrangement for an alternating current circuit including means at one point of the circuit operative to transmit an oscillation of a predetermined frequency only during alternate half cycles of a voltage derived from said circuit, means at another point of the circuit operative to receive said oscillation only during alternate half cycles of a voltage derived from the circuit at said other point, and circuit controlling means arranged to be controlled by said receiving means.

37. A protective arrangement for an electric system connected to be supplied with current at two separate points including circuit interrupting means at one end of a portion of the system intermediate said points, time action fault responsive means at said end connected to be energized from the system for effecting a circuit opening operation of said interrupting means on the occurrence of a fault on the system, means at the other end of said portion for transmitting a current to said one end on the occurrence of predetermined circuit conditions and means at said one end responsive to said transmitted current and operative within the time action of said fault responsive means for preventing said fault responsive means from effecting a circuit opening operation when the fault is outside of said system portion.

ALAN S. FITZ GERALD.